United States Patent [19]

Gottfreid

[11] Patent Number: 6,076,076
[45] Date of Patent: Jun. 13, 2000

[54] PREPAID PRINT CARD SYSTEM AND METHOD

[75] Inventor: Thomas M. Gottfreid, Libertyville, Ill.

[73] Assignee: Moore U.S.A., Inc., Grand Island, N.Y.

[21] Appl. No.: 08/854,594

[22] Filed: May 12, 1997

[51] Int. Cl.[7] .............................. G06F 7/08; G06F 15/20; G06F 15/22
[52] U.S. Cl. ............................. 705/45; 705/26; 705/43; 705/44; 705/408
[58] Field of Search .................................. 235/380, 381; 298/12; 707/507; 705/26, 408, 45, 43, 44

[56] References Cited

U.S. PATENT DOCUMENTS

| | | | |
|---|---|---|---|
| 4,741,575 | 5/1988 | Sloan | 298/12 |
| 4,795,892 | 1/1989 | Gilmore et al. | 235/381 |
| 4,926,325 | 5/1990 | Benton et al. | 364/408 |
| 4,947,028 | 8/1990 | Gorog | 235/380 |
| 5,023,782 | 6/1991 | Lutz et al. | 364/405 |
| 5,146,067 | 9/1992 | Sloan et al. | 235/381 |
| 5,185,857 | 2/1993 | Rozmanith et al. | 395/148 |
| 5,241,464 | 8/1993 | Greulich et al. | 364/401 |
| 5,341,290 | 8/1994 | Lu | 364/408 |
| 5,465,291 | 11/1995 | Barrus et al. | 379/67.1 |
| 5,510,992 | 4/1996 | Kara | 705/408 |
| 5,563,999 | 10/1996 | Yaksich et al. | 707/507 |
| 5,619,024 | 4/1997 | Kolls | 235/381 |
| 5,637,845 | 6/1997 | Kolls | 235/381 |
| 5,684,965 | 11/1997 | Pickering | 395/234 |

FOREIGN PATENT DOCUMENTS

0700024 A2   9/1995   European Pat. Off. .......... G07F 7/10

OTHER PUBLICATIONS

Leonard Carr, Tidel AnyCard MPD Multiple Product Dispenser, PR Newswire, p. 314, Mar. 14, 1997.

Primary Examiner—Allen R. MacDonald
Assistant Examiner—Pedro R. Kanof
Attorney, Agent, or Firm—Nixon and Vanderhye P.C.

[57] ABSTRACT

Prepaid printing services are obtained and provided using remote and host computers. A card or diskette for printing services is purchased and using a remote computer, the host computer is accessed by e-mail or the like. Application software and printer drivers are downloaded from the host to the remote, and the prepaid printing services are actually installed as a print option on the print menu of the remote computer. Document composition and printing to fulfill the printing services request can be by any conventional techniques, and debiting and invoicing are typically practiced simultaneously with document shipment.

20 Claims, 4 Drawing Sheets

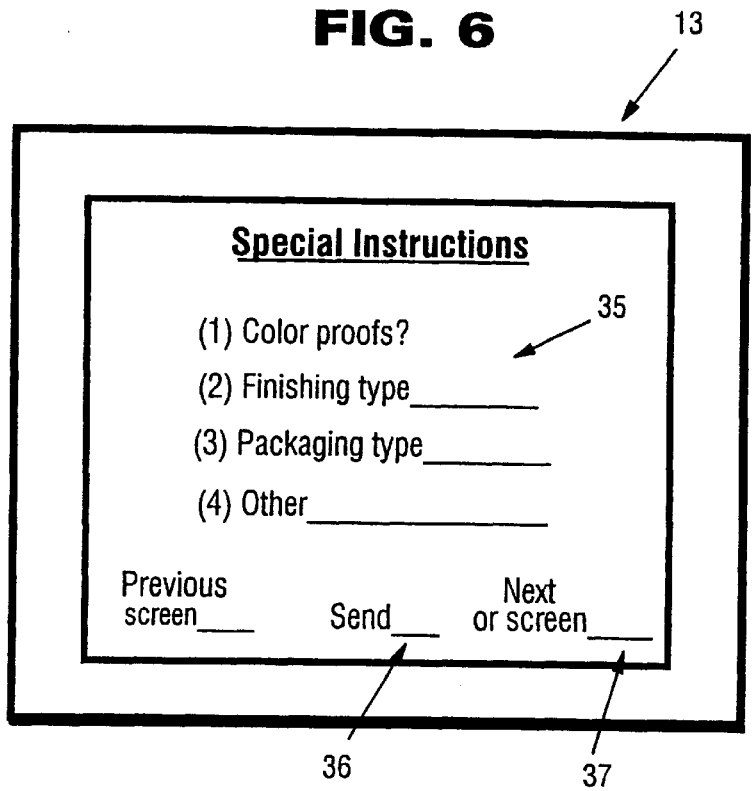
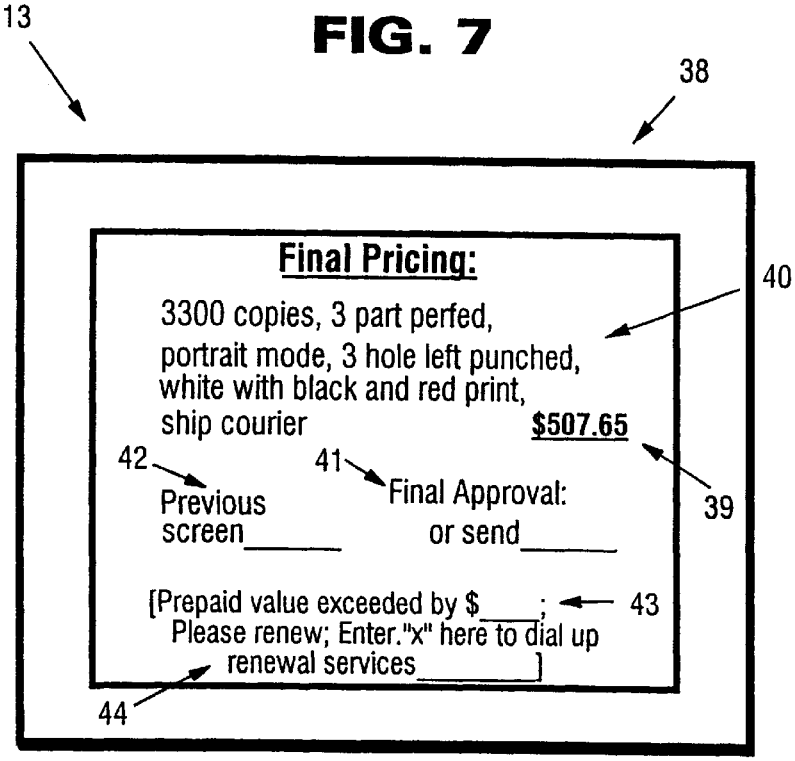

PREPAID PRINT CARD SYSTEM AND METHOD

BACKGROUND AND SUMMARY OF THE INVENTION

The prepaid purchase of goods and services is becoming increasingly popular, for many reasons. The issuer is relieved of order entry and manual file handling, some invoice preparation, handling, mailing, receipt, and deposit functions, and need not worry about bad debt. Also the issuer can bill for extra services rendered through electronic debit, and minimizes disputed billings and wasted labor. The user can limit costs by individuals, machines, or departments and obtain the services and goods easily and effectively. Therefore the use of prepaid cards has become widespread for a number of different activities, including long distance phone services, and the dispensing of utilities (as by using magnetic striped cards such as in U.S. Pat. No. 5,146,067).

While the purchase of business forms and related documents utilizing electronic means has been used effectively commercially for some time (such as shown in U.S. Pat. Nos. 5,241,464 and 5,563,999, which are hereby incorporated by reference herein), to date printing services, or imaged documents prepared utilizing such printing services, have not been provided on a prepaid basis. According to the invention that is now possible. The prepaid printing services, and documents produced thereby, can be offered in the form of cards that look like conventional long distance prepaid phone cards, or may be in the form of computer diskettes (such as conventionally sent out for introducing offers by Internet access providers), and have a predetermined value of printing services or imaged documents. The purchase of the cards or diskettes can be provided by sales reps, at retail outlets, by distributors, or by on-line mechanisms. Information, queries, and the like may readily be transported by e-mail to facilitate quick and accurate transfer of account and product information.

According to one aspect of the present invention a method of obtaining and providing prepaid printing services or imaged documents, using a remote computer having a display screen, and a host computer, is provided. The method comprises the steps of: (a) Purchasing a prepaid print card or computer diskette having a predetermined value of printing services or imaged documents; and then substantially sequentially: (b) Using the card or diskette and the remote computer, electronically accessing the host computer and supplying verification data to the host computer. (c) With the host computer, verifying authenticity of the card or diskette used in step (b), including the remaining prepurchase value. (d) Electronically transmitting printing services or imaged documents order information from the remote computer to the host computer. (e) Electronically composing document information, using the order information. (f) Imaging documents using the electronically composed document information. And, (g) shipping the imaged documents to a desired location.

There may be the further step (h) of substantially simultaneously with step (g) (e.g. right at the time of shipping, or just before or just after shipping) invoicing the value of the imaged documents and related services, so that the user has a confirmation of the transaction. Step (h) may be practiced electronically by a transmission from the host computer to the remote computer, or a hard copy invoice may be sent in the mail or by other known technique.

Step (e) may be practiced to produce a printing plate, and step (f) practiced by printing a web of paper using the printing plate and a printing press. Alternatively or in addition step (e) may be practiced to electrostatically image the documents, produce them by any other conventional type of non-impact or digital imaging.

The method may also comprise the further step (i), before step (d), of producing a draft document electronically; and step (d) may be practiced in part to transmit the draft document to the host computer; and step (e) may be practiced to make a final electronic composition using the draft document. There may be the further step (j), before step (d), of displaying selection of paper size, orientation, margin, and other selection information at the remote computer to facilitate creation of appropriate order information, such as shown in U.S. Pat. No. 5,241,464. There may also be the further step (k), between steps (j) and (d), of displaying a preview document at the remote computer, and the still further step (l), between steps (k) and (b), of displaying a query asking for entry, or confirmation, of basic user information at the remote computer, and at the remote computer displaying a query asking for special color, print, or other instructions.

Typically steps (b) through (g) are repeated until the prepurchased value of the card or diskette of step (a) has been substantially exhausted; and step (a) may be practiced to renew the value of the card or diskette electronically using cash, a credit card or corporate Purchase Order, or any legal tender, which are preprocessed before step (b) may be practiced with a renewed value.

Where step (a) is practiced to purchase a diskette, the diskette includes at least automatic dial-in software which, after the practice of step (b), causes the host computer to download only the necessary application software and print drivers to allow the practice of step (d). [That is, only the necessary print drivers are downloaded from host to remote user, saving transmission time, cost, and disk storage space on the remote computer. Updated drivers may be obtained from the host at any time. This is useful when users buy/access a new printer or decide to print to a new device at the host.] Step (a) may be practiced to purchase a card, and step (b) practiced by dialing (using data associated with the card, such as an access number and phone number on the card) dialing into a BBS or Internet site to activate the card and download application software and print drivers. Step (l) may be practiced in part by providing a full pricing estimate which requires final approval before the practice of step (d). Steps (b) through (d) and (h) may be practiced using e-mail, and the computer diskette software may access the host computer using e-mail. Step (d) may be practiced using a Wide Area Network (WAN).

According to another aspect of the present invention a system for obtaining and providing prepaid printing services or imaged documents is provided. The system comprises the following components: A remote computer having a display screen. A host computer. A prepaid print card or computer diskette having a predetermined value of printing services or imaged documents. Means for using the card or diskette and the remote computer to electronically access the host computer and to supply verification data to the host computer. Means for electronically transmitting printing services or imaged documents order information from the remote computer to the host computer. Means for electronically composing document information using the order information. Means for imaging documents using the electronically composed document information. And, means for debiting the prepaid print card or computer diskette. The means for electronically transmitting may comprise a WAN, and the system may further comprise means for displaying selection of paper size, orientation, margin, and other selection information at the remote computer to facilitate creation of appropriate order information; and means for displaying a preview document at the remote computer. After initialization, the remote computer may be acted upon to provide prepaid print services as a printer option displayed on the remote computer display screen.

The invention has a large number of benefits associated therewith. Among the benefits of the system and method according to the present invention are the following:

It can easily be distributed to many users via disk or down loaded from the Internet, or office LAN.

It can provide unlimited access points.

It may be designed for modem and/or ISDN connection and/or LAN.

Image file and job ticket can be sent to point of manufacture from any PC.

Transfer is not limited by file size, transmission speed is limited only by bandwidth.

It may be available in both Mac and PC versions.

It can be designed to include pricing module or other table information, to allow users the capability of working off-line.

It can bridge current e-mail systems.

It may include transport layer features to assure error free transmission.

It allows access to "virtual office" customers.

It is not developed to be a LAN e-mail system though it does have the capability.

It is not a Bulletin Board System.

It is simple to use, requiring minimal technical support.

It can transport "High Res" files, with no file size restrictions.

Mac and PC versions can interact.

File transmission is guaranteed, dynamic adjustments for line quality.

It provides an audit trail for accounting, and tracing print activity.

"Business to Business" sales are facilitated.

It needs only one disk to install instead of many like other mail packages.

It may employ international implementation, connectivity and distribution.

It is the primary object of the present invention to provide a method and system for the effective prepaid purchasing and fulfillment of printing services and associated imaged documents. This and other objects of the invention will become clear from an inspection of the detailed description of the invention, and from the appended claims.

BRIEF DESCRIPTION OF THE DRAWINGS

FIGS. 2 through 7 are illustrations of various exemplary screens that may be displayed on the remote computer in the practice of the method according to the present invention.

DETAILED DESCRIPTION OF THE DRAWINGS

Figure 1:
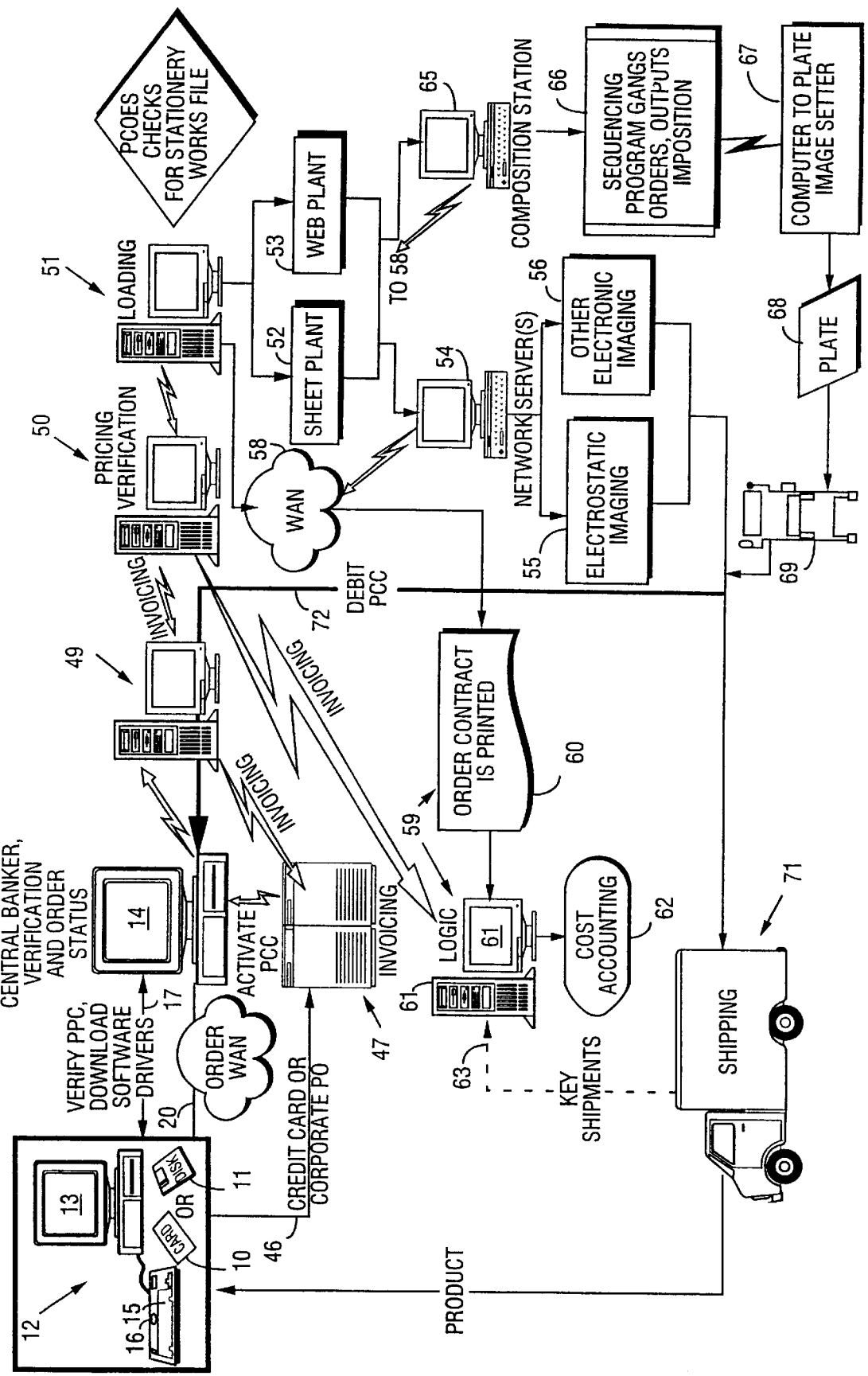
FIG. 1 is a schematic flow chart illustrating various components of the system according to the present invention for practicing a method of obtaining and providing prepaid printing services or imaged documents, according to the present invention.

FIG. 1 schematically illustrates an exemplary system for practicing an exemplary method according to the present invention. The basic component of the system, which allows implementation of the method, is the purchase of a prepaid print card 10 or computer diskette 11, each having a predetermined value of printing services or imaged documents associated therewith. The card 10 may be the same size and configuration as a conventional prepaid long distance phone card, while the diskette 10 may be a conventional computer diskette for a personal computer (PC). The card and/or diskette may be purchased at a retail location, through a sales representative, through a distributor, on-line, or the like. The diskette 11 has software associated therewith which will automatically dial up the appropriate number to connect a remote computer 12, with which it is utilized, having a display screen 13 (and a modem, not shown) to a host computer 14. The remote computer 12 is controlled utilizing a keyboard 15 or the like, which may include a built in mouse 16, or a separate mouse, piezoelectric control, roller ball, or like conventional control for the computer 12.

When the computer 12 with the diskette 11 therein connects to the host, as over the phone line illustrated schematically at 17 in FIG. 1, application software and print drivers are downloaded from the host computer 14 to the remote computer 12. When the card 10 is utilized, a phone number, access code, and the like is typically provided on the card 10, which is employed by the user along with the computer 12 to provide access e.g. by dialing into a BBS or Internet site to activate the card and download application software and print drivers.

Figure 2:
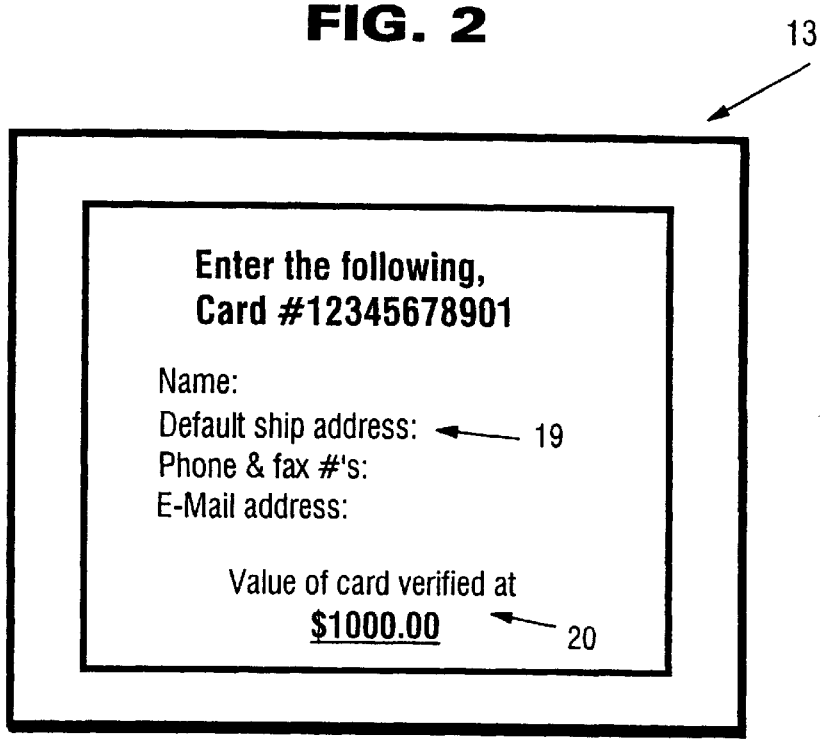

The host computer 14 may be utilized with an almost unlimited number of different remote computers 12. The host 14 typically provides central banker, verification, and order status functions, and may provide for debiting of the prepaid print card (PPC) 10 or diskette 11. The host computer 14 verifies authenticity of the PPC 10 or diskette 11, including the existing (or remaining) prepurchase value. [That is the card or diskette may be, in reality, equates to an account, such as a prepaid account.] When the card 10 or diskette 11 is first used and its authenticity verified, the user registers with the host 14, such as by responding to queries 19 at the display screen 13, as illustrated in FIG. 2. These queries typically include a default shipping address for the document, or information as to pick-up of the documents where anonymity of the user is desired, etc. Also verification of the prepurchase amount or remaining value may be automatically displayed on the screen 13 from the host 14 computer as illustrated schematically at 20 in FIG. 2.

After appropriate verification, printing services or imaged documents order information are electronically transmitted from the remote computer 12 to the host computer 14, as indicated by line 20 in FIG. 1. Transmission may be by e-mail or other Wide Area Network (WAN). Transmission is effected by the user of the computer 12 selecting the appropriate items from the options displayed on the screen 13 utilizing the keyboard 15, mouse 16, or the like.

The diskette may employ an embedded pass code to allow users to access the host from multiple computers. The pass code eliminates the need for a unique password from the user—but also allows people in a department to share one diskette, as a pass key.

FIGS. 3 through 7 illustrate various screens that are displayed on the display 13 in one exemplary form of implementation of the method according to the present invention.

Figure 3:
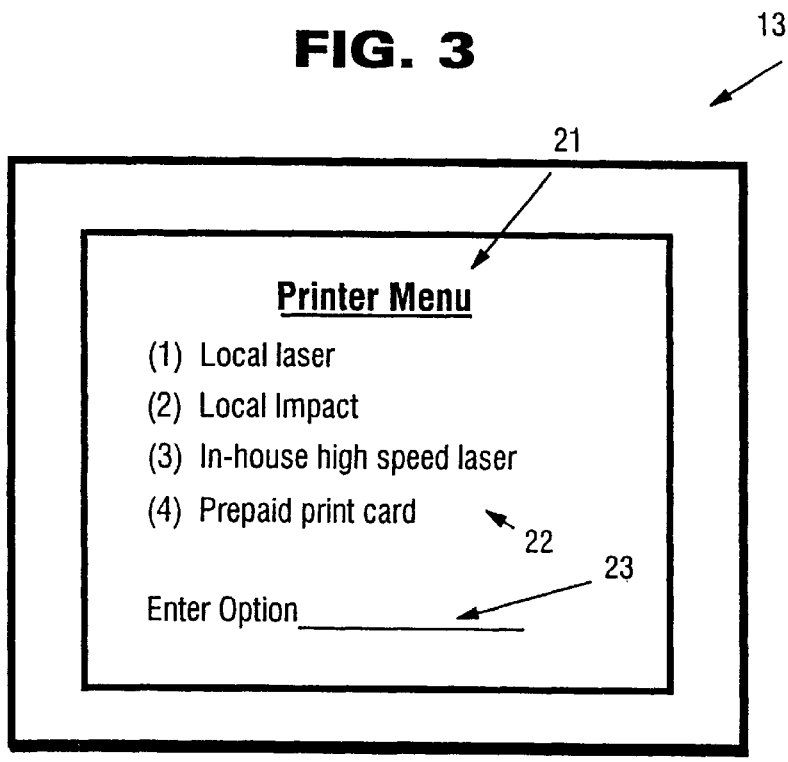

As illustrated in FIG. 3, it is preferred that when the application software and printer drivers are downloaded from the host 14 to the remote computer 12, print/proof drivers are automatically installed on Windows, Mac, or like operating systems (O/S). This allows the user to select the PPC 10 (or diskette 11) as a printer on the printer menu, illustrated schematically at 21 in FIG. 3. Of course any conventional existing printer options may be provided, and for the exemplary embodiment illustrated in FIG. 3, PPC option 22 is number (4), and that number should be entered at the prompt 23 when desired to use the PPC option 22.

Figure 4:
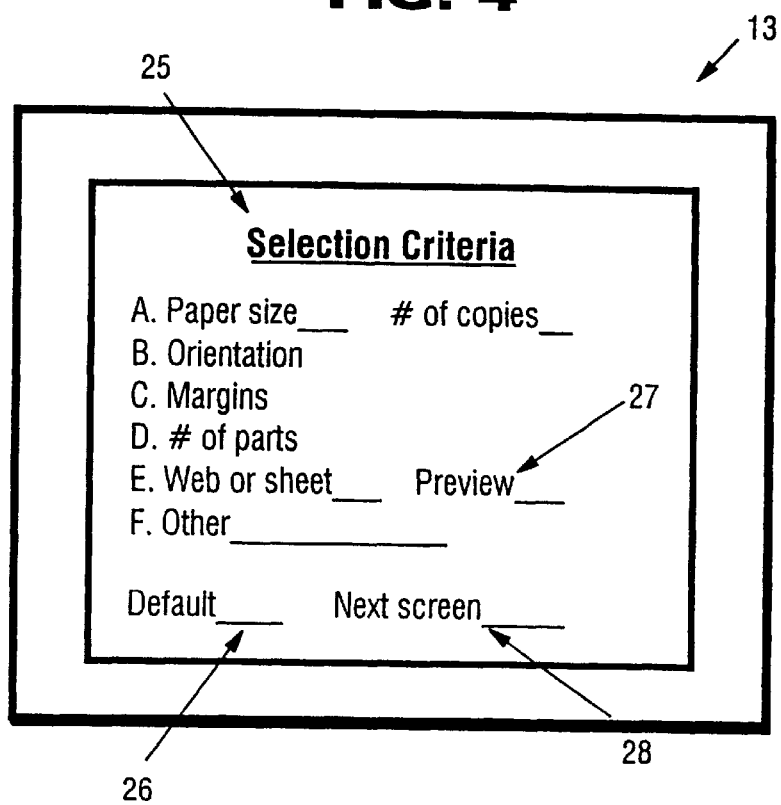

Assuming that the document desired to be printed has already been composed on the computer 12, or is otherwise provided to the computer 12, selection of the option 22 in FIG. 3 brings up the screen illustrated in FIG. 4, which has selection criteria 25. Selection criteria may include all of the criteria such as illustrated and described in U.S. Pat. No. 5,241,464 such as paper size, number of copies, orientation, margins, number of parts if it is a multi-part form or document, web or sheet form, hole punching, perfing, adhesive application, or a wide variety of other criteria. A default selection 26 may be provided if default information has been previously entered, or if the selection being made at that time is for default purposes. After the appropriate selection criteria 25 are in fact selected, then the print preview 27 option may be selected, or the print preview screen may be bypassed when the next screen 28 option is selected.

Figure 5:
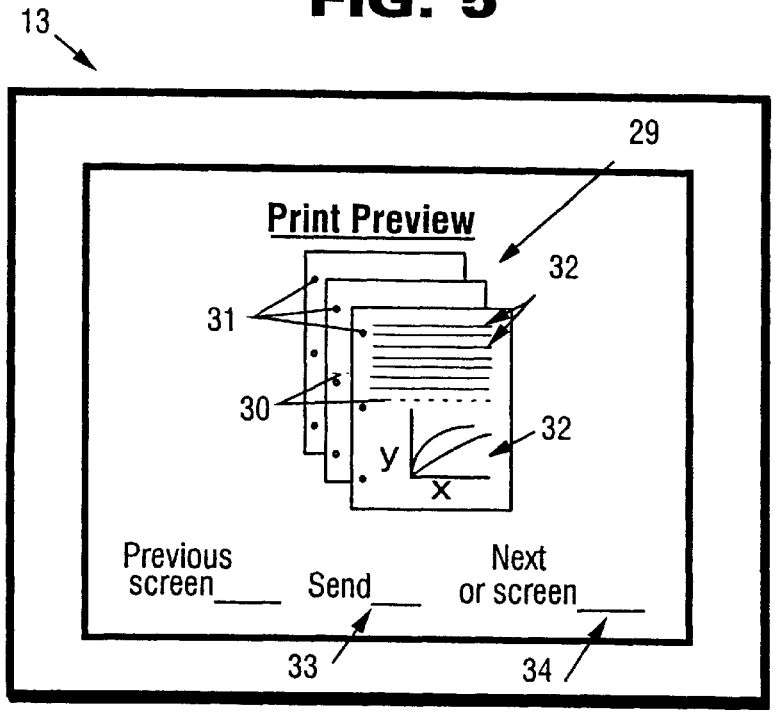

FIG. 5 illustrates a print preview screen 29. Preferably the print preview screen schematically illustrates the document (e.g. business form) in the exact manner that it will be produced. For example the location of the words on the paper, the orientation of the paper, the number of parts of the form, any perfing, punching, or the like, are illustrated. For the exemplary form illustrated at 29 in FIG. 5, and this is one of only literally thousands of permutations and combinations, a three-part form is illustrated, having perforation 30 on the first and second parts, three hole punching 31 on all parts, portrait orientation of an 8½×11 sheet, and words or other indicia (such as pictures, drawings, graphs, logos, etc.) 32, provided as illustrated.

The screen of FIG. 5 may have an option allowing the document to be immediately sent, as indicated by option 33, or where the next (and/or subsequent) screen(s) to be reviewed as indicated at 34. Where there are any special instructions or where final pricing is desired, the next screen option 34 will be selected.

The next screen option 34 from FIG. 5, when selected, may result in the special instruction screen 35 of FIG. 6. This may allow other special instructions to be provided, such as relating to colors, color proofing, finishing type, packaging type, etc. The screen 35 also may have a send option 36 and a next screen option 37. When the next screen option 37 is selected on the screen 38 of FIG. 7 may be displayed.

The screen 38 of FIG. 7 may be the final pricing screen, which may give the total amount of the document production as indicated schematically at 39, and which may also have a detailed description of all of the features selected as illustrated at 40. If the final pricing is approved, then option 41 is selected, or the previous screen 42 may be selected. Any of the screens of FIGS. 4 through 7 may also have a "cancel" option (not shown) also.

If desired, in order to facilitate renewal of the PPC 10 or diskette 11 where the prepaid value may have been exceeded by the amount shown at 39, indicia such as illustrated at 43 and 44 in FIG. 7 also may be provided. Indicia 43 may display the amount that the final pricing 39 exceeds the remaining prepurchased value of the card 10 or diskette 11, and by utilizing the option 44 the renewal of the card 10 or diskette 11 may be automatically effected. Returning to FIG. 1, this renewal may be effected over telephone lines, e-mail, WAN, or the like, as illustrated schematically at 46 in FIG. 1, by accessing the renewal data base 47. Renewal may be effected using a credit card, a corporate purchase order, or in any other manner that the issuer of the card 10/disc 11 finds a suitable manner of prepayment.

After the send option (33, 36, or 41) is activated and the order information is transmitted, as indicated at 20 in FIG. 1, various other computer and/or data bases may be utilized to process the information for debiting, invoicing, pricing, document composition, and the like. In the embodiment illustrated in FIG. 1, the order information in the "out box" of the computer 12 utilizes a transport layer, such as e-mail, to electronically transfer the order to the host 14.

The exemplary embodiment of FIG. 1 indicates various other levels of computer processing of the order information transmitted as indicated schematically at 20 in FIG. 1. This is an exemplary embodiment only, and one or more of the individual steps may be omitted, combined, or enhanced.

The station 49 interfaces with the host 14, the data base 47 for invoicing and receiving renewal purchases, and interfaces with the pricing verification station 50. The pricing verification station 50 interfaces with the loading station 51 which—depending upon the order information transmitted—either selects a sheet plant 52 or a web plant 53 for imaging the documents to be printed. If the sheet plant 52 is selected, then the order passes through a network server or servers 54 which then effect appropriate imaging of documents, such as by different types of electronic imaging stations as illustrated schematically at 55 and 56 in FIG. 1. For example a MIDAX imaging system available from Moore U.S.A. of Lake Forest, Ill. may be utilized to actually image the documents; or various other non-impact or impact techniques, preferably non-impact techniques, may be employed.

Simultaneously station 51 communicates through a WAN 58 with the server 54 and station 59 where an order contract is printed as indicated at 60 and provided to the logic computer 61. This allows appropriate cost accounting, as illustrated at 62, and shipment release commands, as illustrated schematically at 63, in FIG. 1.

If a web plant 53 is selected, the document will be further electronically composed at a composition station computer 65, which through various sequencing programs, orders, outputs, and in position 66 communicates with a computer to plate image setter 67 to produce a printing plate 68 (e.g. an offset plate). This is used with a conventional printing press 69 to image documents.

The final documents imaged, either at 55, 56, or 69, are sent to a shipping station, as illustrated schematically at 71 in FIG. 1. While debiting may occur at other points during the process, preferably debiting occurs upon transmission to the shipping location 71 and/or completion of the actual printing (and packaging thereof), as illustrated schematically by the debit control line 72 in FIG. 1. The debit information goes back to the host 14 to effect debiting, and then invoicing is provided such as an electronic format with display on the screen 13 at the remote computer 12. Since the debiting takes place in the host computer 14, the next time the user of the card or the diskette 11, at the computer 12, accesses the host 14, the then current value of the card 10 or diskette 11 is known, and can also be displayed to the user as indicated schematically at 20 in FIG. 2. Alternatively, an e-mail message can be sent as an advisory and a shipment confirmation.

In the system according to the present invention, the means for using the card 10 or diskette 11 and the remote computer 12 to electronically access the host computer 14, and to supply verification data to the host computer 14, may include a WAN, e-mail, and/or phone lines, or other conventional electronic access means. The means for electronically transmitting the printing services or imaged documents order information from the remote computer 12 to the host computer 14 (e.g. illustrated schematically at 20 in FIG. 1) may also comprise a WAN, e-mail, and/or phone lines, or other electronic transmission means. The means for electronically composing the document information (e.g. including variable information) using the order information may include the conventional composing station 65, the network server 54, or any similar conventional composition equipment, depending upon what type of imaging is to be practiced (e.g. electrostatic imaging 55, printing press 69, etc.). Means for imaging documents using the electronically composed document information may be the may be the imaging stations 55, 56, 69, or any other conventional imaging stations. The means for debiting the prepaid print card 10 or computer diskette 11 may include the software and electronic transmission components associated with the debiting money 72, software in the host computer 14, and the like. The means for displaying the selection of paper size, orientation, etc. (as illustrated in FIG. 4), and the means for displaying a preview document (as illustrated at 29 in FIG. 5) at the remote computer 12 display screen 13 may comprise any suitable software which is downloaded from the host 14 to the remote computer 12 to control the screen 13 thereof, or other suitable conventional software or hardware which can accomplish that function.

It will thus be seen that according to the present invention an advantageous method and system of and for obtaining and providing prepaid printing services or imaged documents (including business forms) is provided. While the invention has been herein shown and described in what is presently conceived to be the most practical and preferred embodiment thereof it will be apparent to those of ordinary skill in the art that many modifications may be made thereof within the scope of the invention, which scope should be accorded the broadest interpretation of the appended claims so as to encompass all equivalent methods and systems.

What is claimed is:

1. A method of obtaining and providing prepaid printing services or imaged documents, using a remote computer having a display screen, and a host computer, comprising the steps of:
   (a) purchasing a prepaid print card or computer diskette having a predetermined value of printing services or imaged documents; and then substantially sequentially:
   (b) using the card or diskette and the remote computer, electronically accessing the host computer and supplying verification data to the host computer;
   (c) with the host computer, verifying authenticity of the card or diskette used in step (b), including the remaining purchase value;
   (d) electronically transmitting printing services or imaged documents order information from the remote computer to the host computer;
   (e) electronically composing document information, using the order information at a location distinct from the remote location;
   (f) imaging documents using the electronically composed document information at a location distinct from the remote location;
   (g) shipping the imaged documents to a desired location; and
   (h) at the appropriate time, debiting the prepaid print card or computer diskette.

2. A method as recited in claim 1 wherein step (h) is practiced substantially simultaneously with step (g), and also includes invoicing the value of the imaged documents and related services.

3. A method as recited in claim 2 wherein step (h) is practiced electronically by transmission from the host computer to the remote computer.

4. A method as recited in claim 1 wherein step (e) is practiced to produce a printing plate, and wherein step (f) is practiced by printing a web of paper using the printing plate and a printing press.

5. A method as recited in claim 1 comprising the further step (i), before step (d), of producing a draft document electronically; and wherein step (d) is practiced in part to transmit the draft document to the host computer; and wherein step (e) is practiced to make a final electronic composition using the draft document.

6. A method as recited in claim 1 comprising the further step (j), before step (d), of displaying selection of paper size, orientation, margin, and other selection information at the remote computer to facilitate creation of appropriate order information.

7. A method as recited in claim 6 comprising the further step (k), between steps (j) and (d), of displaying a preview document at the remote computer.

8. A method as recited in claim 7 comprising the further step (l), between steps (k) and (d), of displaying a query asking for entry, or confirmation, of basic user information at the remote computer; and at the remote computer displaying a query asking for special color, print, or other instructions.

9. A method as recited in claim 1 comprising the further step of repeating steps (b)–(h) until the prepurchased value of the card or diskette of step (a) has been substantially exhausted.

10. A method as recited in claim 1 wherein step (a) is practiced to purchase a diskette including at least automatic dial-in software which, after step (b), causes the host computer to download only the necessary application software and print drivers to allow the practice of step (d).

11. A method as recited in claim 1 wherein step (a) is practiced to purchase a card; and wherein step (b) is practiced by, using data associated with the card, dialing into a BBS or Internet site to activate the card and download application software and print drivers.

12. A method as recited in claim 8 wherein step (l) is practiced in part by providing a full pricing estimate which requires final approval before the practice of step (d).

13. A method as recited in claim 8 wherein after initialization, the remote computer is acted upon to provide prepaid print services as a printer option displayed on the remote computer display screen.

14. A method as recited in claim 9 wherein after initialization, the remote computer is acted upon to provide prepaid print services as a printer option displayed on the remote computer display screen.

15. A method as recited in claim 1 wherein steps (b)–(d) and (h) are practiced using e-mail.

16. A method as recited in claim 10 wherein the computer diskette software accesses the host computer using e-mail.

17. A method as recited in claim 1 wherein step (a) is practiced to renew the value of the card or diskette electronically using cash, a credit card, or corporate Purchase Order, which are preprocessed before step (b) may be practiced with a renewed value.

18. A method as recited in claim 1 wherein step (d) is practiced using a Wide Area Network, and wherein step (e) is practiced including using variable information.

19. A system for obtaining and providing prepaid printing services or imaged documents, comprising:

a remote computer having a display screen;

a host computer;

a prepaid print card or computer diskette having a predetermined value of printing services or imaged documents;

means for using the card or diskette and the remote computer to electronically access the host computer and to supply verification data to the host computer;

means for electronically transmitting printing services or imaged documents order information from the remote computer to the host computer;

means for electronically composing document information using the order information at a location distinct from the remote location;

means for imaging documents using the electronically composed document information at a location distinct from the remote location; and means for debiting said prepaid print card or computer diskette.

20. A system as recited in claim 19 wherein said means for electronically transmitting comprises a WAN; and further comprising means for displaying selection of paper size, orientation, margin, and other selection information at the remote computer to facilitate creation of appropriate order information; and means for displaying a preview document at the remote computer.

* * * * *